(12) United States Patent
Wilson et al.

(10) Patent No.: US 12,007,069 B2
(45) Date of Patent: Jun. 11, 2024

(54) BRACKET FOR ADJUSTABLE-DEPTH MOUNTING OF ELECTRICAL BOXES

(71) Applicant: ERICO International Corporation, Solon, OH (US)

(72) Inventors: Jeffrey Alan Wilson, Cuyahoga Falls, OH (US); Michael Hung-Sun Oh, Twinsburg, OH (US); Kevin Jacobs, Cuyahoga Falls, OH (US)

(73) Assignee: ERICO International Corporation, Solon, OH (US)

( * ) Notice: Subject to any disclaimer, the term of this patent is extended or adjusted under 35 U.S.C. 154(b) by 0 days.

(21) Appl. No.: 18/457,902

(22) Filed: Aug. 29, 2023

(65) Prior Publication Data

US 2023/0400148 A1 Dec. 14, 2023

Related U.S. Application Data

(63) Continuation of application No. 16/952,197, filed on Nov. 19, 2020, now Pat. No. 11,739,882.

(60) Provisional application No. 62/987,041, filed on Mar. 9, 2020, provisional application No. 62/941,492, filed on Nov. 27, 2019.

(51) Int. Cl.
*H02G 3/00* (2006.01)
*F16M 13/02* (2006.01)
*H02G 3/12* (2006.01)

(52) U.S. Cl.
CPC ............ *F16M 13/022* (2013.01); *H02G 3/12* (2013.01)

(58) Field of Classification Search
CPC ............................. F16M 13/022; H02G 3/12
See application file for complete search history.

(56) References Cited

U.S. PATENT DOCUMENTS

| 3,834,658 | A | 9/1974 | Theodorides |
| 4,634,015 | A | 1/1987 | Taylor |
| 5,042,673 | A | 8/1991 | McShane |
| 5,117,996 | A | 6/1992 | McShane |
| 5,289,934 | A | 3/1994 | Smith et al. |
| 5,603,424 | A | 2/1997 | Bordwell et al. |
| 5,661,264 | A | 8/1997 | Reiker |
| 5,677,512 | A | 10/1997 | Reiker |
| 5,854,443 | A | 12/1998 | Reiker |

(Continued)

FOREIGN PATENT DOCUMENTS

| CN | 201994611 U | 9/2011 |
| CN | 206806923 U | 12/2017 |

(Continued)

OTHER PUBLICATIONS

NVent, CADDY T-Grid Box Hanger, specification sheet, 1 page, Copyright 2021 nVent.

(Continued)

*Primary Examiner* — Pete T Lee
(74) *Attorney, Agent, or Firm* — Quarles & Brady LLP

(57) ABSTRACT

A bracket for adjustable-depth mounting of an electrical box relative to a support structure can include a support body and a support arm. The support body can be configured to be secured to the support structure. A fastener can be retained on the support arm and can be adjusted relative to the support arm to move the electrical box to be secured at any of a plurality of depths relative to the support body.

20 Claims, 11 Drawing Sheets

(56) References Cited

U.S. PATENT DOCUMENTS

| | | |
|---|---|---|
| 5,883,331 A | 3/1999 | Reicker |
| 5,907,124 A | 5/1999 | Reicker |
| 5,909,006 A | 6/1999 | Reicker |
| 5,931,325 A | 8/1999 | Filipov |
| 5,938,157 A | 8/1999 | Reiker |
| 5,942,726 A | 8/1999 | Reiker |
| 5,965,845 A | 10/1999 | Reiker |
| 5,981,874 A | 11/1999 | Reiker |
| 6,096,974 A | 8/2000 | Reiker |
| 6,204,450 B1 | 3/2001 | Reiker |
| 6,207,894 B1 | 3/2001 | Reiker |
| 6,207,897 B1 | 3/2001 | Reiker |
| 6,207,898 B1 | 3/2001 | Reiker |
| 6,242,696 B1 | 6/2001 | Reiker |
| 6,281,439 B1 | 8/2001 | Reiker |
| 6,291,768 B1 | 9/2001 | Reiker |
| 6,303,859 B1 | 10/2001 | Reiker |
| 6,303,862 B1 | 10/2001 | Reiker |
| 6,335,486 B1 | 1/2002 | Reiker |
| 6,423,899 B1 | 7/2002 | Reiker |
| 6,875,922 B1 * | 4/2005 | Petak .................. H02G 3/123 174/57 |
| 7,312,395 B1 | 12/2007 | Gretz |
| D579,879 S | 11/2008 | Wegner et al. |
| D584,235 S | 1/2009 | Montena |
| 7,544,889 B1 * | 6/2009 | Sanchez ............... H02G 3/126 174/53 |
| 7,586,039 B1 * | 9/2009 | Gretz .................. H02G 3/123 174/53 |
| 7,645,936 B2 | 1/2010 | Magno, Jr. |
| 7,838,769 B2 | 11/2010 | Peck |
| 8,076,577 B2 | 12/2011 | Mango, Jr. et al. |
| 8,076,578 B1 | 12/2011 | Gretz |
| 8,650,743 B2 | 2/2014 | Baldwin et al. |
| 8,975,519 B2 | 3/2015 | Lalancette et al. |
| 9,252,579 B2 | 2/2016 | Korcz et al. |
| 9,711,955 B2 | 7/2017 | Hitchman |
| 9,887,524 B1 | 2/2018 | Gretz |
| 10,096,983 B2 | 10/2018 | Kummer |
| 10,193,318 B1 | 1/2019 | Hitchman |
| D841,432 S | 2/2019 | Nikayin et al. |
| 10,256,614 B2 | 4/2019 | Korcz et al. |
| 10,263,403 B2 | 4/2019 | Korcz et al. |
| 10,447,019 B2 | 10/2019 | Ediger et al. |
| 2003/0189043 A1 | 10/2003 | Wegner et al. |
| 2005/0230142 A1 | 10/2005 | Dinh |
| 2009/0057303 A1 | 3/2009 | Oddsen et al. |
| 2009/0183891 A1 | 7/2009 | Kramer, Jr. |
| 2010/0176138 A1 | 7/2010 | Zacharevitz et al. |
| 2010/0252552 A1 | 10/2010 | Nikayin et al. |
| 2010/0288554 A1 | 11/2010 | Jafari |
| 2014/0202758 A1 | 7/2014 | Lolachi |
| 2014/0224792 A1 | 8/2014 | Beneke |
| 2014/0262417 A1 | 9/2014 | Korcz et al. |
| 2017/0012421 A1 | 1/2017 | Terwilleger |
| 2017/0093140 A1 | 3/2017 | Nikayin et al. |
| 2019/0312420 A1 | 10/2019 | Korcz et al. |
| 2020/0052473 A1 | 2/2020 | Gilstrap |

FOREIGN PATENT DOCUMENTS

| | | |
|---|---|---|
| CN | 208142617 U | 11/2018 |
| CN | 208423700 U | 1/2019 |
| EP | 1744427 B1 | 7/2008 |
| EP | 2822120 B1 | 7/2015 |
| WO | 03085792 A1 | 10/2003 |
| WO | 2009015041 A2 | 1/2009 |
| WO | 2010008778 A2 | 1/2010 |
| WO | 2011038238 A2 | 3/2011 |
| WO | 2013028872 A1 | 2/2013 |
| WO | 2016100580 A1 | 6/2016 |
| WO | 2019160876 A1 | 8/2019 |

OTHER PUBLICATIONS

NVent, CADDY Heavy Duty T-Grid Box Hanger, specification sheet, 1 page, Copyright 2021 nVent.

Primus Cable, Adjustable Depth Mounting Bracket, product sheet, 4 pages, Copyright 2019 Primus Cable.

* cited by examiner

BRACKET FOR ADJUSTABLE-DEPTH MOUNTING OF ELECTRICAL BOXES

CROSS-REFERENCE TO RELATED APPLICATIONS

This application is a continuation of U.S. patent application Ser. No. 16/952,197, filed Nov. 19, 2020, which claims priority to U.S. Provisional Patent Applications Nos. 62/941,492 and 62/987,041, filed Nov. 27, 2019 and Mar. 9, 2020, respectively, all of which are incorporated herein by reference in their entireties.

BACKGROUND

In many applications, it may be useful to support electrical boxes at different depths relative to support structures, such as ceiling or wall structures of buildings. For example, in order to dispose electrical boxes of different depths to be flush with internal wall or ceiling surfaces, it may be useful to support the electrical boxes at different depths relative to a particular support structure.

SUMMARY

Some embodiments of the invention provide a bracket for adjustable-depth mounting of an electrical box relative to a support structure. The bracket can include a support body that is configured to be secured to the support structure, a support arm, and a fastener that is retained on the support arm and is configured to permit adjustment of the fastener relative to the support arm. The support arm can be configured to hold the fastener relative to the electrical box, so that the adjustment of the fastener relative to the support arm moves the electrical box to be secured at any of a plurality of depths relative to the support body.

Some embodiments of the invention provide a bracket for adjustable-depth mounting of an electrical box relative to a support structure. The bracket can include a support body and a support arm. The support body can be configured to be secured to the support structure and to surround exterior sides of the electrical box. The support arm can extend integrally from the support body and can include an extension portion and a support portion. The extension portion can be configured to extend from the support body along the exterior of a side of the electrical box. The support portion can extend at an angle from an end of the extension portion opposite the support body and can be configured to retain a threaded fastener to the exterior of a back side of the electrical box with the threaded fastener extending into engagement with a fastener opening on the electrical box so that rotational adjustment of the fastener relative to the support portion moves the electrical box to be secured at any of a plurality of depths relative to the support body.

Some embodiments of the invention provide a method of adjusting a mounting depth of an electrical box relative to a bracket. The electrical box can be secured to the bracket using a fastener secured to a support arm of the bracket. The fastener can be rotated relative to the support arm to move the electrical box to any of a plurality of depths relative to a support body of the bracket.

Some embodiments of the invention provide a bracket assembly for adjustable-depth mounting of an electrical box relative to a support structure. A support body can be configured to be secured to the support structure, the support body including a body opening that is fully enclosed by the support body and sized to slidably receive the electrical box. First and second support arms can extend integrally from respective edges of the support opening to respective free ends and can include respective bends configured to dispose the free end behind respective corners of a rear wall of the electrical box, with a support portion proximate each of the free ends rotatably supporting a corresponding threaded fastener that is configured to threadedly engage with the electrical box to be rotatable from inside the electrical box to adjust a depth of the electrical box within the body opening. A plurality of attachment arms, including at least one of a spring arm or a bendable tab, can extend integrally from the support body and can be configured to collectively secure the support body to the support structure. A plurality of guide tabs can extend integrally from the support body into alignment with the body opening, the guide tabs being configured to biasingly engage side walls of the electrical box to guide movement of the electrical box within the opening.

Some embodiments of the invention provide a bracket assembly for adjustable-depth mounting of an electrical box relative to a support structure. A support body can be configured to be secured to the support structure and can include a body opening sized to slidably receive the electrical box. A first support arm and a second support arm can extend from the support body on opposing sides of the body opening, with the first support arm extending independently relative to the second support arm. Each of the first and second support arms can have a support portion configured to extend behind the electrical box when the electrical box is slidably received in the body opening, the end portion retaining a fastener that is configured to be adjusted from inside the electrical box, relative to the corresponding first or second support arm to move the electrical box to any of a plurality of depths relative to the support body.

Some embodiments of the invention provide a manufacturing blank for a bracket assembly. The manufacturing blank can include a single-piece planar body that includes a central body opening, first and second supports, and first and second sets of arms. The central body opening can be fully enclosed by material of the single-piece planar body. The first and second supports can extend into the central body opening from opposing edges of the central body opening. The first and second sets of arms can extend away from the central body opening, from each of two opposing sides of the single-piece planar body. Each of the first and second sets of arms can include a first attachment arm that extends farther away from the central body opening than second and third attachment arms of the first or second set of arms and that includes a free end with an extended tab opposite the central body opening

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
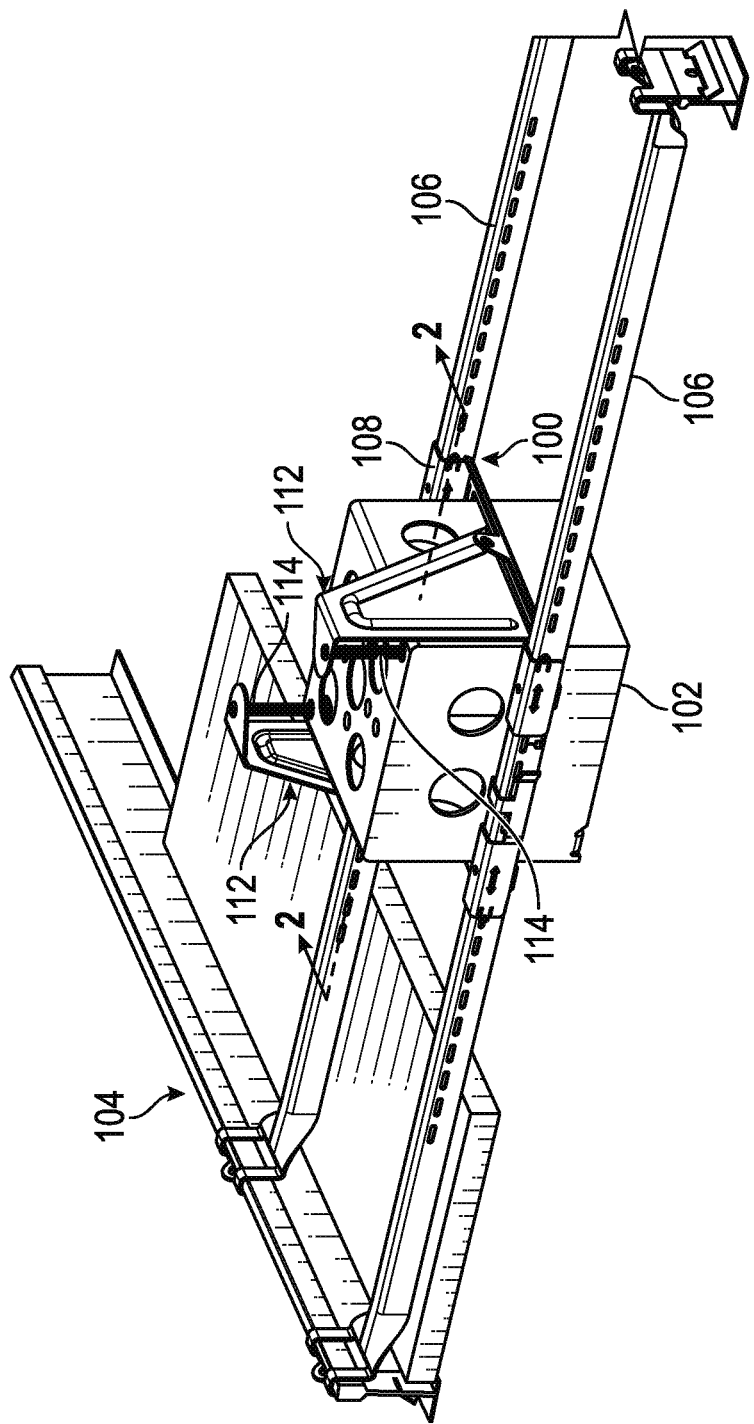
FIG. 1 is an isometric view of a ceiling structure and a bracket according to an embodiment of the invention, with the bracket supporting an electrical box relative to the ceiling structure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal," "vertical," "front," "rear," "left," "right," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, in some contexts, it may be useful to secure electrical boxes (or other components) at different depths relative to a support structure. For example, in order to comply with requirements that a forward opening of an electrical box be flush with an interior surface of drywall or a ceiling tile, the electrical box may need to be secured to a support structure (e.g., a stud, support bracket, ceiling structure, etc.) at a depth that depends on the depth of the electrical box. Because electrical boxes can be provided with a variety of depths, it may accordingly be necessary to secure different electrical boxes to a particular support structure at different depths relative to the support structure. Embodiments of the invention can provide a bracket and associated assembly or method that can allow easy adjustment of the mounting depth of an electrical box relative to a support structure, including after the bracket has been installed on the support structure.

Embodiments of the invention are presented below in the context of particular support structures, including T-grid ceiling support bars and associated brackets. Although these configurations can be particularly useful in some contexts, including due to the particular requirements for mounting electrical boxes to ceiling structures, other configurations are possible. For example, the principles disclosed herein—and embodiments of the invention—can be used with ceiling support structures other than those expressly illustrated or discussed, with non-ceiling support structures (e.g., telescoping or other brackets attached to wall studs), or in a variety of other contexts. Similarly, although particular configurations of electrical boxes are illustrated and discussed below, some embodiments of the invention can be used with electrical boxes having different configurations. And some embodiments of the invention can be used to adjust the mounting depth of components other than electrical boxes.

Generally, embodiments of the invention can include a bracket that includes a support body and one or more support arms that are collectively configured to support an electrical box relative to one or more other structures (e.g., a ceiling or between-stud support). In some cases, the support arm(s) can be integrally formed with the support body, although other configurations are possible.

Each support arm can be configured to adjustably receive a fastener, with the fastener extending from the support arm to engage the support body or the electrical box. The fastener can then be adjusted relative to the support arm in order to manually adjust the mounting depth of the electrical box relative to the support body and any associated support structure (e.g., ceiling or between-stud support). Generally, in this regard, adjustment of the fastener can move the electrical box in an axial direction defined by the fastener, relative to at least one of the support body or the associated support arm.

In some embodiments, the fastener can be a ribbed fastener, such as a fastener with threads or circumferential ridges. For example, some embodiments can include a threaded fastener that is rotatable but not translatable relative to the associated support arm. The threaded fastener can accordingly be rotated by a user in order to cause a translational adjustment of the electrical box. For example, rotation of a threaded fastener may cause translational movement of an electrical box via engagement with a threaded fastener opening on the electrical box or on the support body.

In some embodiments, it may be useful to arrange the support body and the one or more support arms so that one or more associated fasteners extend within the interior of the electric al box. In some such embodiments, the fasteners may be adjustable from within the electrical box. For example, a support arm may rotatably and non-translatably secure a threaded fastener that extends from the support arm through a threaded fastener opening on the electrical box into the interior of the electrical box. A user can then engage a head of the fastener from within the electrical box, thereby rotating the fastener to cause the electrical box to be translated relative to the support arm via the threaded engagement of the fastener with the fastener opening and the non-translatable engagement of the fastener with the support arm.

The ability to adjust the mounting depth of an electrical box by engaging a fastener within the interior of the electrical box may be useful, for example, in order to facilitate easier adjustment after the electrical box has been installed (e.g., behind drywall or ceiling tiles). However, in some embodiments, the mounting depth of an electrical box can be adjusted outside of the electrical box. For example, a support arm may be secured to an electrical box and a threaded fastener may extend along the exterior of the electrical box between a rotatable but non-translatable engagement with the support arm and a rotatable engagement with a threaded fastener opening in a support body. A user may then adjust the mounting depth of the electrical box via rotational adjustment of the fastener.

Figure 2:
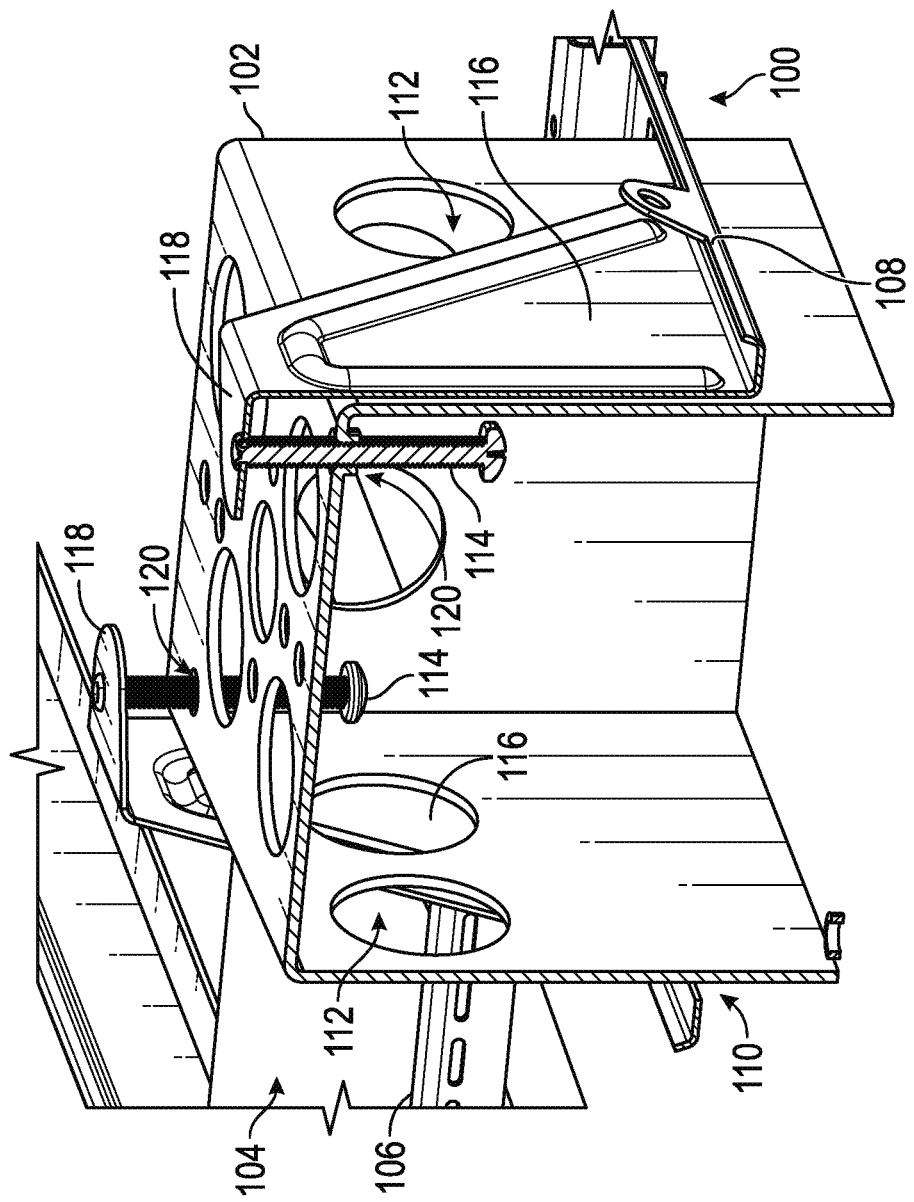
FIG. 2 is an isometric sectional partial view of the ceiling structure and bracket of FIG. 1 taken along plane 2-2 of FIG. 1.

Referring to FIGS. 1 and 2, an example bracket 100 according to an embodiment of the invention is installed to adjustably support an electrical box 102 relative to a ceiling structure 104. In the illustrated example, the ceiling structure 104 includes standard T-grid supports and a set of ceiling brackets 106 extending therebetween. Correspondingly, a support body 108 of the bracket 100 is configured to engage the ceiling brackets 106 and, in particular, is configured to be slidably adjustable relative to the ceiling brackets 106. In other embodiments, however, other configurations are possible, including configurations other than for ceiling support structures.

As illustrated in FIG. 2 in particular, the support body 108 includes a central opening 110 that is configured to receive and surround the electrical box 102. This can provide for easy installation of the electrical box 102 and relatively stable support thereof. In other embodiments, however, other configurations are possible, including configurations in which a support body does not fully surround exterior sides of an electrical box.

To allow for adjustment of the mounting depth of the electrical box relative to the support body 108 and the ceiling brackets 106, two support arms 112 extend from opposing sides of the support body 108 to support respective fasteners 114. In the illustrated embodiment, the support arms 112 are integrally formed with the support body 108 and extend from adjacent to the central opening 110, in particular from a connection to the support body 108 at an edge of the central opening 110. This may allow the bracket 100 to be manufactured with particular efficiency, although other configurations are possible.

In the illustrated embodiment, the extension portions 116 are configured to contact the electrical box 102 between the support body 108 and the support portion 118, as may help to stabilize the electrical box 102 and guide smooth movement of the electrical box 102 during depth adjustments (e.g., as further described below). In other embodiments, however, other configurations are possible.

Generally, as discussed above, support arms can support associated fasteners so that adjustment of the fasteners relative to the support arms can adjust the mounting depth of an associated electrical box. In different embodiments, different configurations are possible for support arms and associated fasteners. As illustrated in FIG. 2, for example, each of the support arms 112 includes an extension portion 116 that extends upwardly (or rearwardly, depending on the installation orientation) along an exterior side of the electrical box 102. Each of the support arms 112 also includes a support portion 118 that angles (e.g., at 90°) away from the extension portion 116 at a bend opposite the support body 108.

Thus arranged, the support portion 118 can support the associated fastener 114 exterior to and in axial alignment with (i.e., relative to the axial direction of the fastener 114) the rear wall of the electrical box 102. In particular, the support portions 118 extend behind the rear wall of the electrical box 102 at opposing corners thereof (i.e., at corners not included on a common edge of the rear wall) so that the fasteners 114 extend through opposing corners of the rear wall of the electrical box 102. As also generally discussed below, this may help to provide even, easy, and reliable adjustment of the depth of the electrical box 102 while also helping to prevent the fasteners 114 from unduly interfering with wires or electrical devices (not shown) within the electrical box 102.

Continuing, the fasteners 114 extend from the support portions 118 of the support arms 112 through fastener openings 120 in the rear wall of the electrical box 102. Thus, via rotation of the fasteners 114, the electrical box 102 can be moved in the axial direction of the fasteners 114 in order to adjust the mounting depth of the electrical box 102 relative to the support body 108. In particular, in the illustrated embodiment, the fasteners 114 are rotatable relative to the support portions 118 but are translationally (axially) fixed relative to the support portions 118 (e.g., via riveting or peening of the fasteners, use of E-, C-, or other clips, use of integral or removable collars, or other techniques). The fasteners 114 are also threadedly engaged with threads on extruded features at the fastener openings 120. Accordingly, when the fasteners 114 are rotated, the threaded engagement of the fasteners 114 with the fastener openings 120, and the rotatable but non-translational engagement of the fasteners 114 with the support portions 118, can collectively cause the electrical box 102 to move axially along the fasteners 114. Thus, via rotation of the fasteners 114 and corresponding axial movement of the fasteners 114 through the fastener openings 120, the electrical box 102 can be secured at any of a plurality of depths relative to the support body 108. Indeed, because of the threaded configuration of the fasteners 114, the electrical box 102 can be secured at any depth along a continuous range, as defined by the available length of the fasteners 114.

As discussed herein, unless otherwise indicated, "translationally fixed" and the like does not necessarily indicate an absolutely fixed arrangement, in which zero translational movement is permitted. Rather, some translationally fixed components (e.g., the fasteners 114) may be able to move translationally somewhat, but only to a certain amount and generally not so as to provide meaningful translational adjustment of a corresponding component (e.g., an electrical box). For example, depending on how the fasteners 114 are fixed to the support portions 118, the fasteners 114 may be able to move slightly in the axial direction, relative to the support portions 118 (e.g., by 1-5 mm or 1-3% of the axial length of the fasteners 114 or of the total depth of the electrical box 102).

In the illustrated embodiment, heads of the fasteners 114 are disposed entirely within the interior of the electrical box 102, via the extension of the fasteners 114 from the support portions 118 through the fastener openings 120. This arrangement may be useful in some cases, because the open front of the electrical box 102 may remain readily accessible even after other surrounding structures (e.g., ceiling tiles or drywall) have been installed around the electrical box 102. Accordingly, for example, even after ceiling tiles have been installed for the ceiling structure 104 of FIGS. 1 and 2, a user may still easily manually adjust the depth of the electrical box 102 by accessing the fasteners 114 via the front opening of the electrical box 102. Further, disposing the fasteners 114 behind and within, rather than alongside, the electrical box 102 can help to reduce the overall footprint of the bracket 100 and electrical box 102 as installed (i.e., relative to an area in a plane perpendicular to the axis of the fasteners 114) and avoid interference between the fasteners are external features (e.g., features of a building support structure). In other embodiments, however, including as discussed below, other configurations are possible.

In some embodiments, other aspects of the configuration illustrated in FIGS. 1 and 2 can also be changed while preserving similarly beneficial adjustability. For example, in some embodiments, fasteners may be translationally fixed relative to a support arm and may engage a threaded feature at a different location on or in an electrical box. Or a fastener threadedly engaged with a support arm and translationally fixed but rotatable relative to an electrical box. Similarly, although configurations with a set of opposing support arms (e.g., at opposing corners) may sometimes provide a particularly optimal balance between stability and ease of adjustment, some configurations may have a different number of support arms, or one or more support arms disposed differently relative to a support body than is illustrated in FIGS. 1 and 2.

Figure 3:
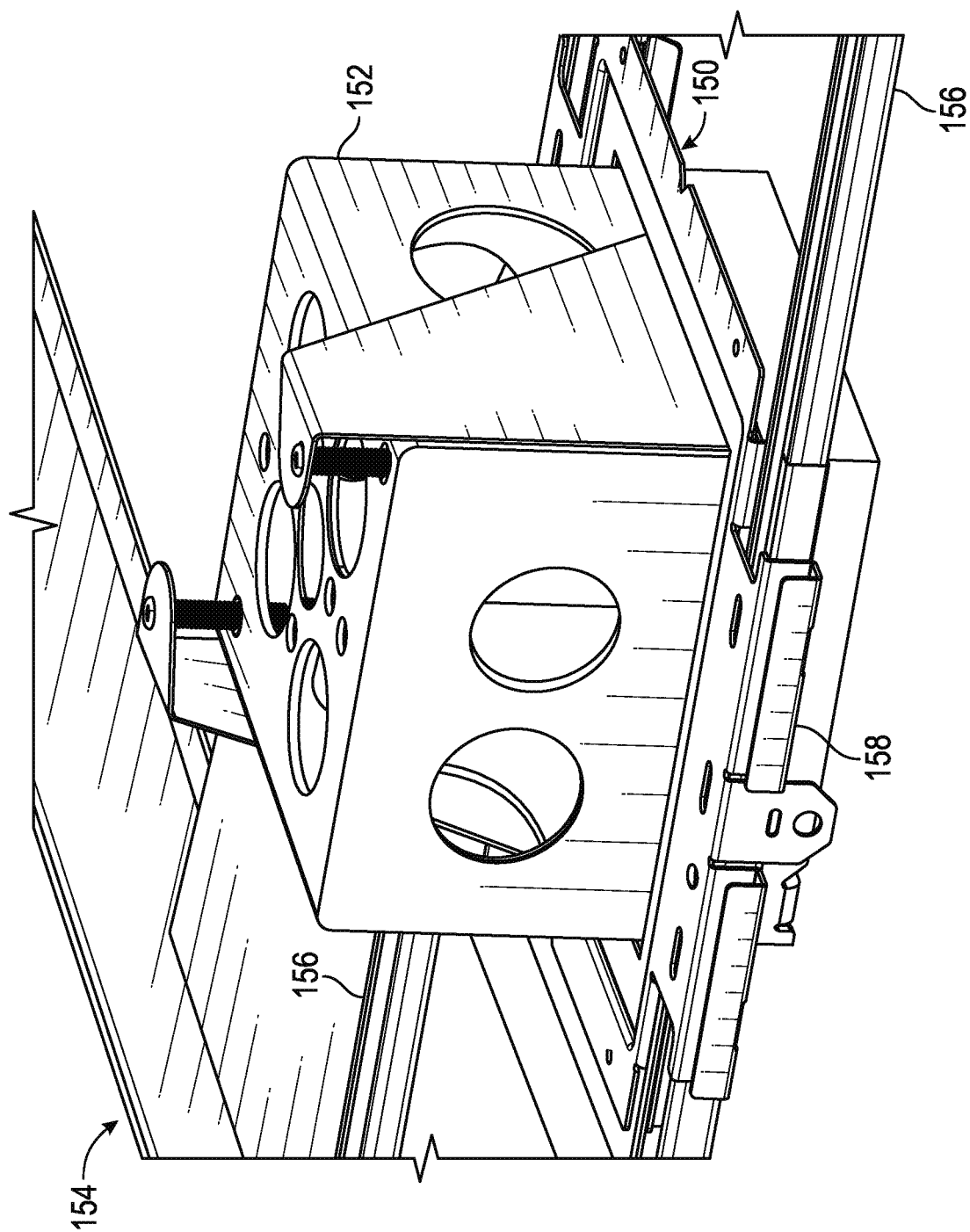
FIG. 3 is an isometric partial view of a ceiling structure and another bracket according to an embodiment of the invention, with the bracket supporting an electrical box relative to the ceiling structure.

As another example, FIG. 3 illustrates a bracket 150 that is configured similarly to the bracket 100, so that the mounting depth of an electrical box 152 relative to a ceiling structure 154 can be easily manually adjusted from the interior of the electrical box 152. In some aspects, however, the bracket 150 differs from the bracket 100. For example, a support body 158 of the bracket is configured to engage telescoping ceiling brackets 156, of a different configuration than the ceiling brackets 106.

Figure 4:
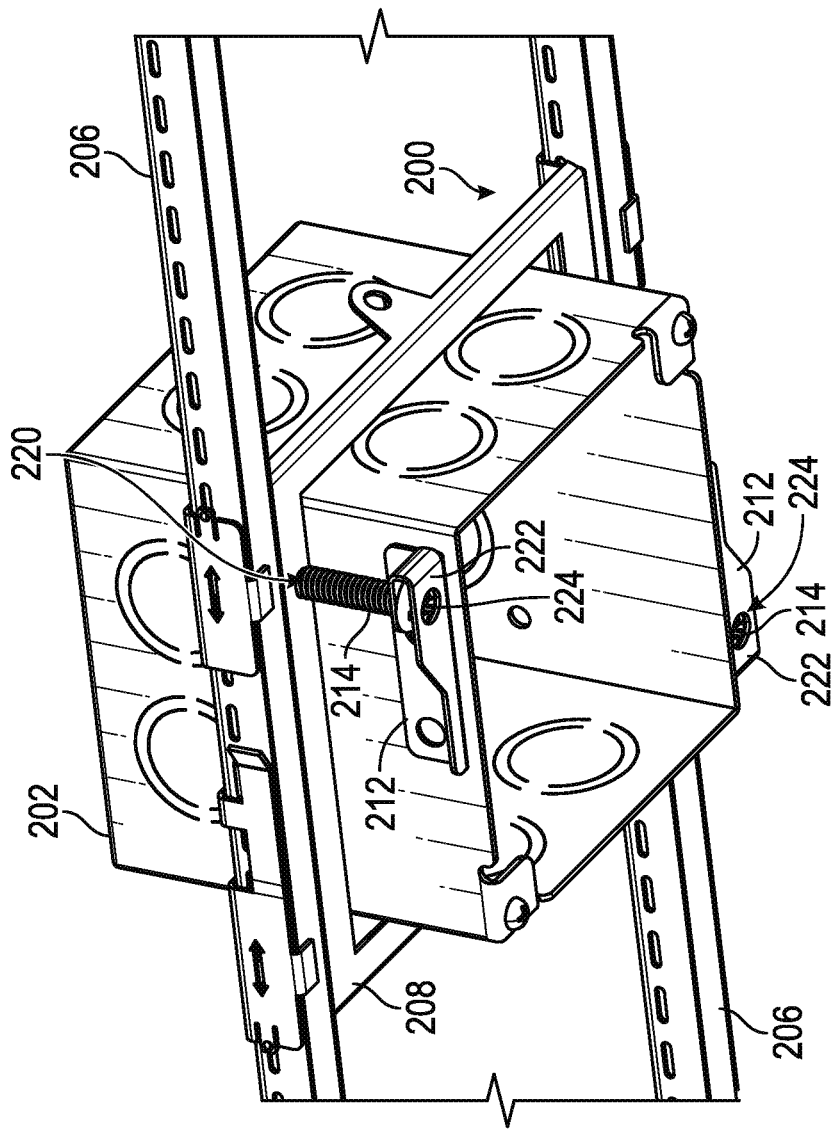
FIGS. 4 and 5 are isometric partial views of a support structure and a bracket according to an embodiment of the invention, with the bracket supporting an electrical box relative to the support structure.
Figure 5:
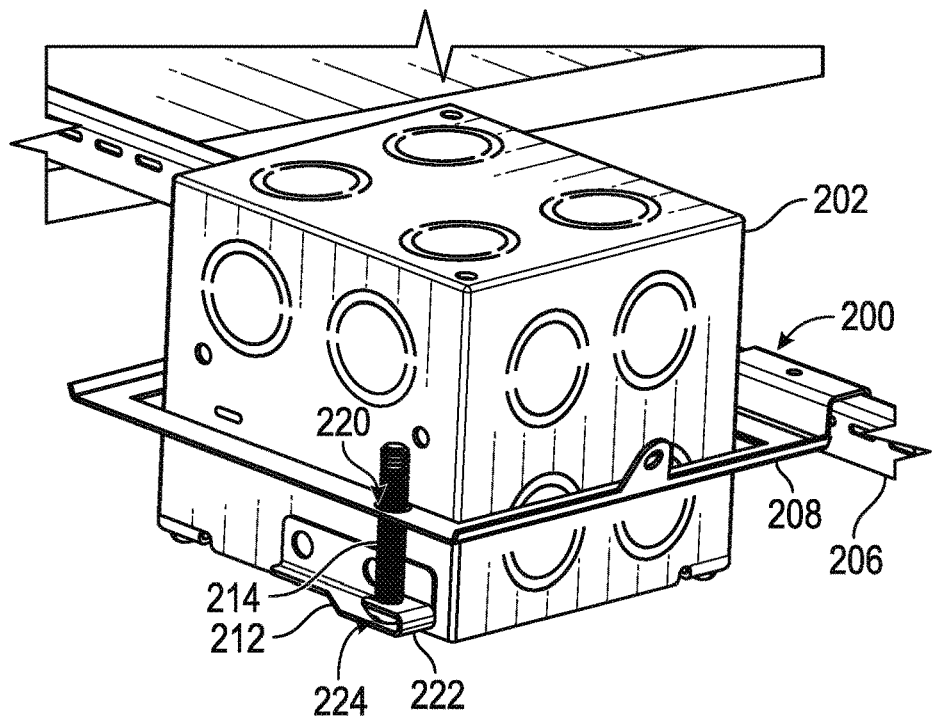

In some embodiments, a support arm may be separate from a support body, so that adjustment of a fastener moves the support arm relative to the support body and thereby adjusts a mounting depth of an associated mounting bracket. A bracket 200 of this type according to an embodiment of the invention is in FIGS. 4 and 5.

Similarly to the brackets 100, 150, the bracket 200 includes a support body 208 that is configured to surround an electrical box 202 and support the electrical box 202 relative to a support structure (e.g., ceiling brackets 206). In contrast to the brackets 100, 150, however, support arms 212 of the bracket 200 are separated and spaced apart from the support body 208 and are secured to exterior sides of the electrical box 202 (e.g., directly attached to the box 202, using welding or fasteners, or integrally formed with the box 202).

Similarly to the support arms 112, the support arms 212 are configured to retain threaded fasteners 214 so that the fasteners 214 are translationally fixed but rotatable relative to the support arms 212. In contrast to the fasteners 114, however, the fasteners 214 extend from the support arms 212 to engage threaded fastener openings 220 on the support body 208 rather than on the electrical box 202. Accordingly, as the fasteners 214 are rotated relative to the support arms 212, the fixed engagement of the support arms 212 with the electrical box, the non-translational engagement of the fasteners 214 with the support arms 212, and the threaded engagement of the fasteners 214 with the support body 208 cause the electrical box 202 to translate relative to the support body 208 (i.e., in the axial direction of the fasteners 214). Thus, via rotation of the fasteners 214 and axial movement of the fasteners 214 through the fastener openings 220, the electrical box 202 can be secured at any of a plurality of depths relative to the support body 208.

As also noted above, in different embodiments, different arrangements can be used to secure fasteners to support arms. In the illustrated embodiment, for example, each of the support arms 212 includes a stamped fold 222 that forms a clip to fix a head of the associated fastener 214 against translation while still allowing the fastener 214 to rotate. Further, an access opening 224 is provided on a forward side of each of the folds 222 (relative to the orientation of the electrical box 202) so that a hand tool can be used to manually adjust each of the fasteners 214 without removing the fastener 214 from the fold 222.

Also in contrast to the configurations of the brackets 100, 150, the fasteners 214 of the bracket 200 extend along exterior sides of the electrical box 202. In some embodiments, this arrangement may also provide notable benefits. For example, because the fasteners 214 do not extend within the electrical box 202, the entire interior volume of the electrical box 202 remains available to receive and arrange other components.

In some embodiments, as also discussed above, parts of a bracket can be configured to extend along (e.g., contact) one or more sides of an electrical box in order to help to stabilize the electrical box or to help guide depth adjustments thereof. Accordingly, for example, some embodiments similar to the bracket 200 can include structures similar to the extension portions 116 of the bracket 100 (see, e.g., FIG. 2), or other features, that extend from adjacent to a central opening of a bracket (or elsewhere) in order to contact and support an electrical box secured to the bracket.

Figure 6:
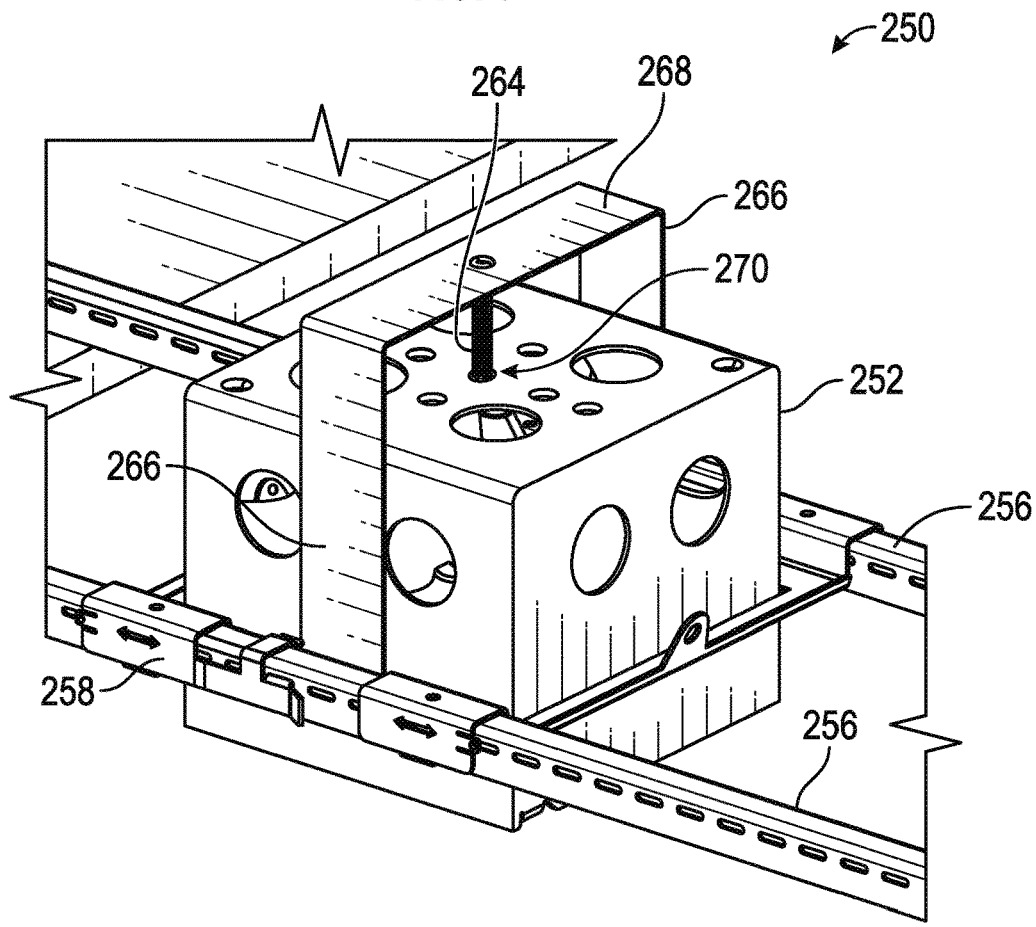
FIG. 6 is an isometric partial view of a ceiling structure and a bracket according to an embodiment of the invention, with the bracket supporting an electrical box relative to the ceiling structure.

Although the use of multiple adjustable fasteners can provide some benefits relative to stability, some embodiments may use only a single adjustable fastener. For example, as illustrated in FIG. 6, a bracket 250 is configured to adjustably support an electrical box 252 relative to ceiling brackets 256. The bracket 250 is generally similar to the bracket 100 (see, e.g., FIG. 2), with a support body 258 and two extension portions 266 that extend on opposing sides of the electrical box 252. In contrast to the bracket 100, however, the bracket 250 includes only a single support portion 268 that extends between the extension portions 266 across the back wall of the electrical box 252 (i.e., the extension portions do not form independent support arms). Correspondingly, only a single fastener 264, riveted to the support portion 268, extends through a central threaded fastener opening 270 in the electrical box 252, so that a mounting depth of the electrical box 252 can be adjusted by rotating the single fastener 264. In other embodiments, multiple fasteners can be used with a similar bracket, or a single fastener can be used with brackets that are configured differently (e.g., do not have a bridging support portion as shown for the support portion 268).

Figure 7:
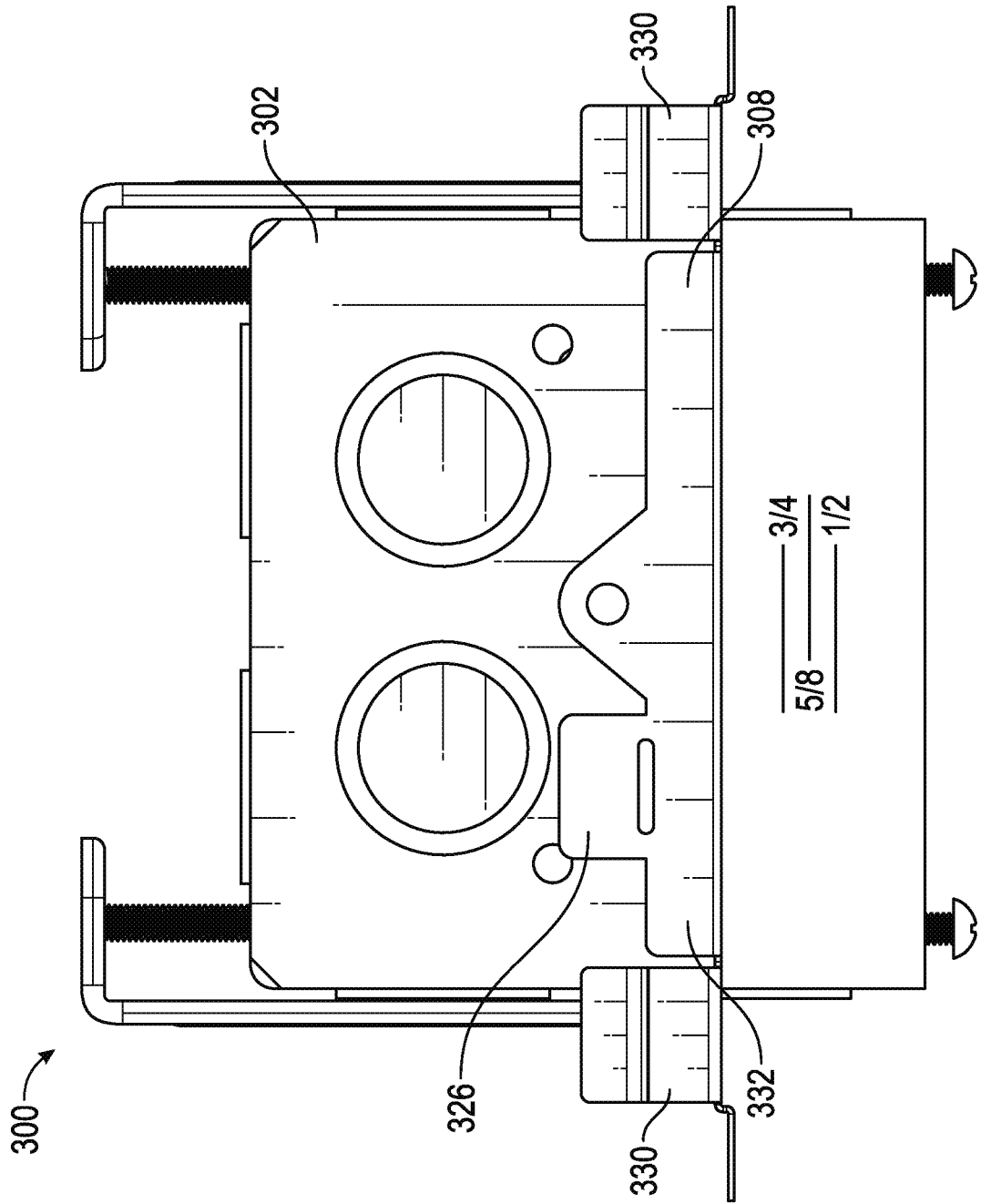
FIG. 7 is a front plan view of another bracket according to an embodiment of the invention, with the bracket supporting an electrical box.
Figure 8:
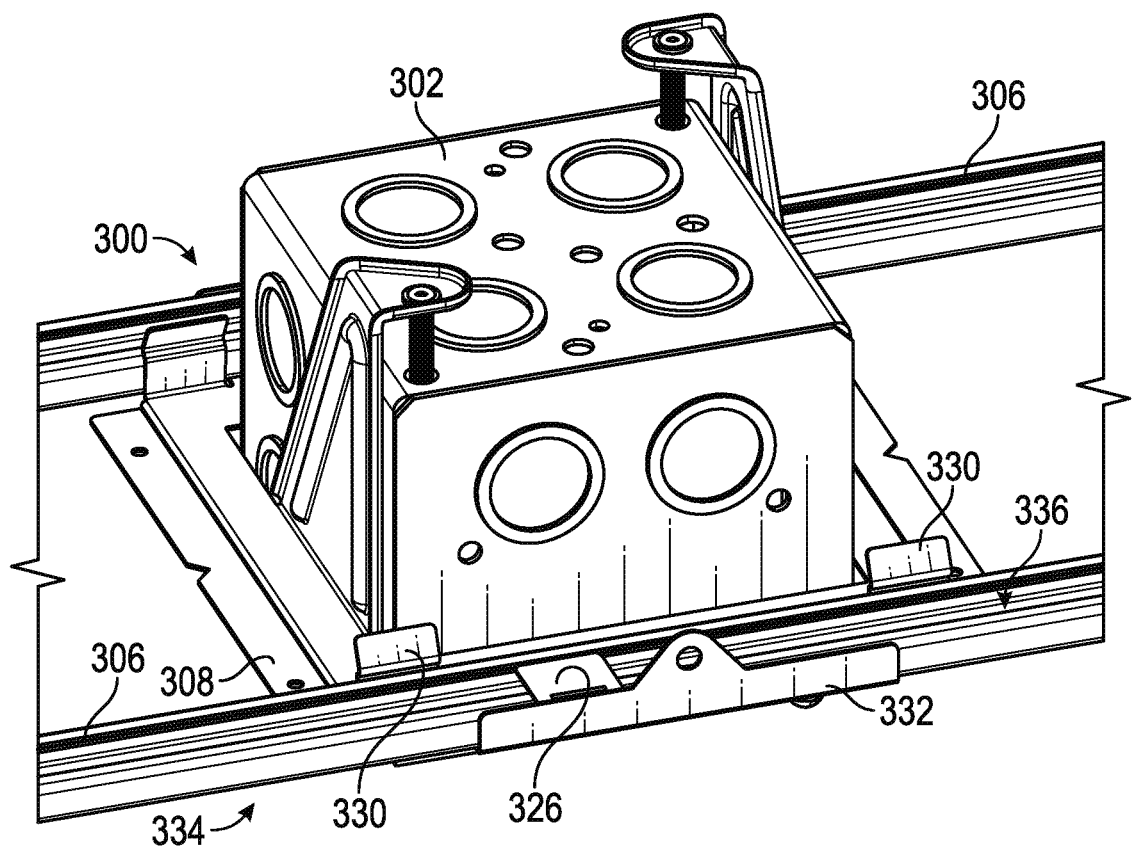
FIG. 8 is an isometric partial view of the bracket of FIG. 7 and a support structure, with the bracket supporting the electrical box relative to the support structure.

FIGS. 7 and 8 illustrate a bracket 300 that is generally similar in design and functionality to the brackets 100, 150 of FIGS. 1 and 3. Like the brackets 100, 150, the bracket 300 is configured so that the mounting depth of an electrical box 302 relative to a support structure (e.g., telescoping ceiling brackets 306 of FIG. 8) can be easily manually adjusted from the interior of the electrical box 302 and discussion of brackets 100, 150 above generally also applies to the bracket 300 (and vice versa). In some aspects, however, the bracket 300 differs from the brackets 100, 150. For example, as also discussed below, a support body 308 of the bracket 300 includes bendable tabs 326 (only one shown) that are configured to engage the ceiling brackets 306 (see, e.g., FIG. 8). Further, the support body 308 also includes sets of attachment arms, here configured as exterior arms 332 of the support body 308 that support the bendable tabs 326 and as resilient interior spring arms 330, disposed on opposite sides of each of the exterior arms 332.

As best seen in FIG. 8, the bracket 300 is configured to be mounted to the ceiling brackets 306 with the support body 308 contacting the ceiling brackets 306 on a first side 334, so that the ceiling brackets 306 are gripped between sets of the arms 330, 332 on each of two opposing sides of the bracket 300. With the support body 308 thus disposed, the bendable tabs 326 can then be bent from an installation configuration (see FIG. 7) toward the electrical box 302 (and the corresponding spring arms 330) and into an installed configuration, in which the tabs 326 overlay an the ceiling brackets 306 on an opposing second side 336 and thereby further secure the support body 308 to the ceiling brackets 306. As a result, the support body 308 of the bracket 300 can be easily secured to the ceiling brackets 306 without separate fasteners and, in particular, is configured to be slidably adjustable relative to the ceiling brackets 306 once so secured. Of note, although the bracket 300 can be secured to a support structure without using fasteners, including as discussed above, it may nonetheless be useful to further secure the bracket 300 with threaded fasteners (e.g., as inserted through a front face of the attachment arm 332 or the support body 308).

In the embodiment illustrated, the first side 334 of the ceiling bracket 306 is a lower (bottom) side thereof, and the second side 336 is an upper (top) side thereof. Thus, the bracket 300 can be mounted to ceiling brackets 306 from below, which may provide an improved installation process relative to conventional designs that must be installed from above. However, other installation orientations are possible, including installations in which the support body 308 is oriented vertically (e.g., as attached to a between-stud telescoping bracket (not shown)) or installed from above a support structure (e.g., similarly to the brackets 100, 150, 200, 250). Further, although the bracket 300 of the FIGS. 7 and 8 includes two bendable tabs 326 asymmetrically disposed on the exterior attachment arm 332, other numbers or configurations of bendable tabs may be used in other embodiments.

Figure 9:
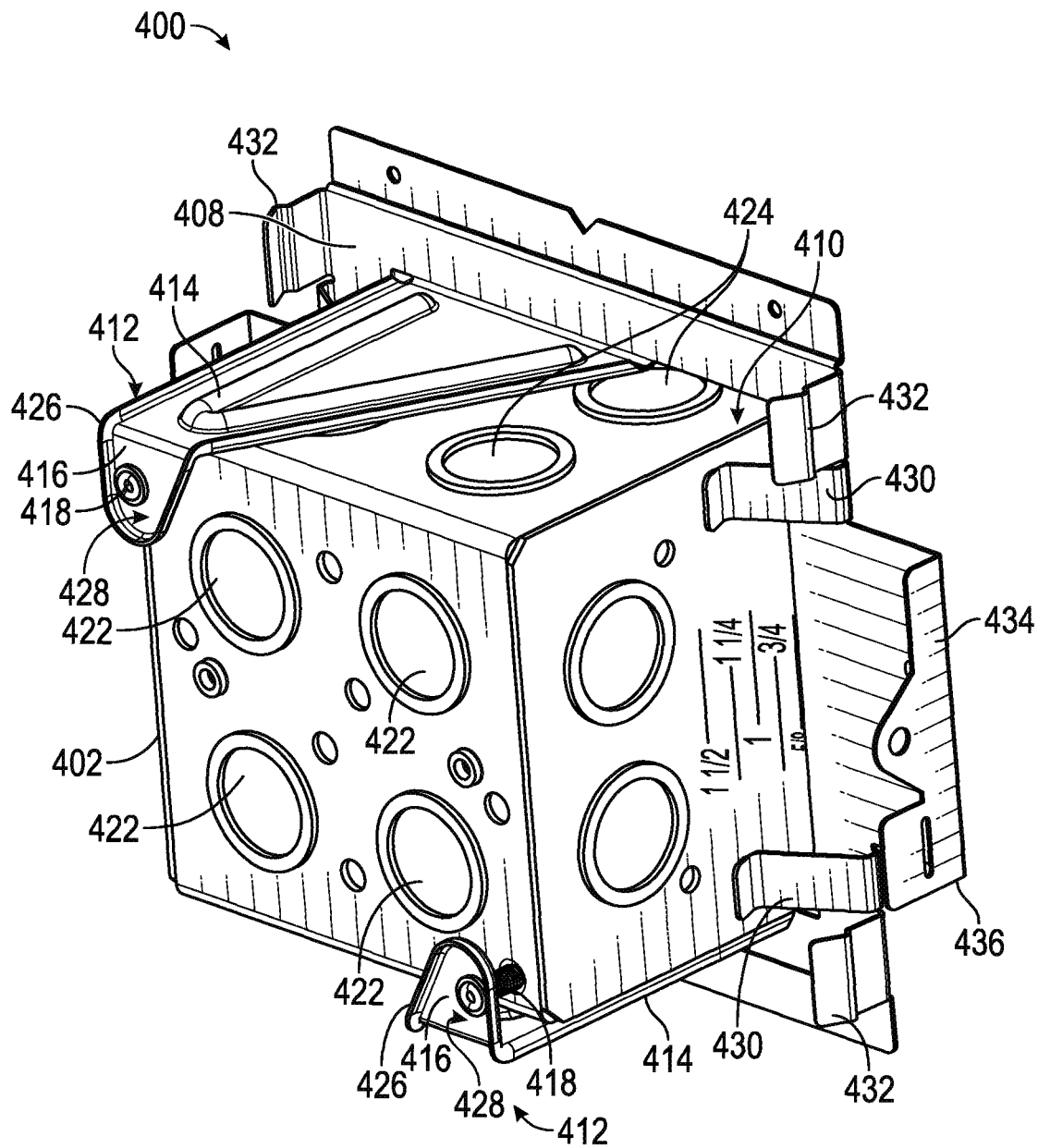
FIG. 9 is an isometric view of another bracket according to an embodiment of the invention, with the bracket supporting an electrical box.
Figure 10:
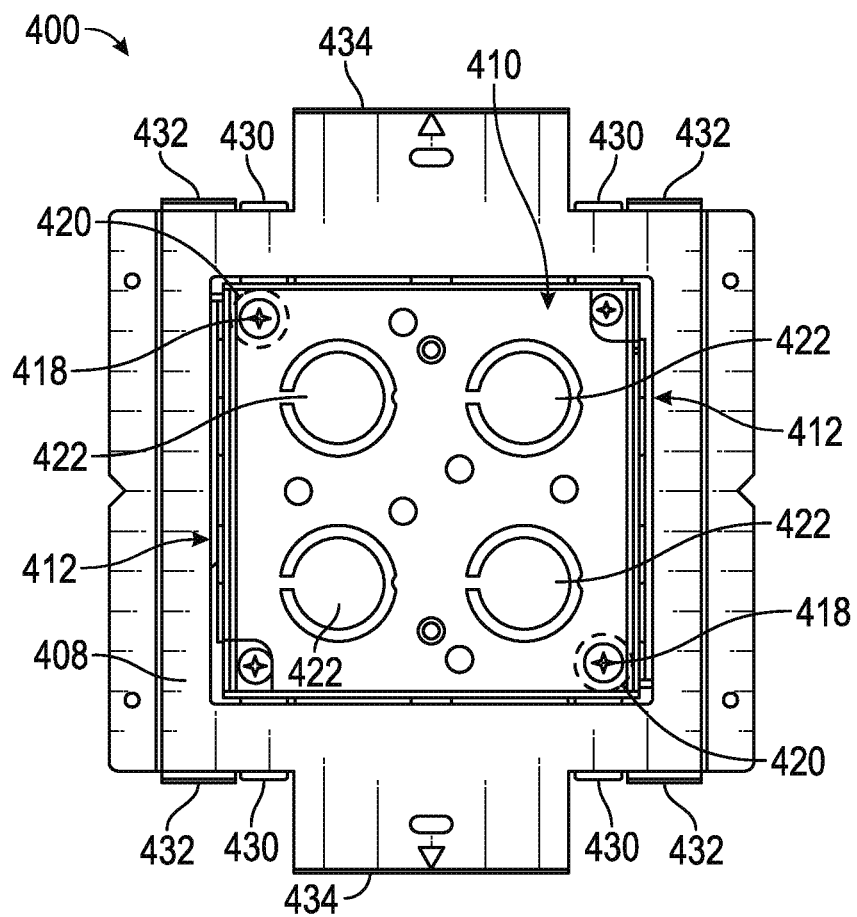
FIG. 10 is a front elevation view of the bracket of FIG. 9.
Figure 11:
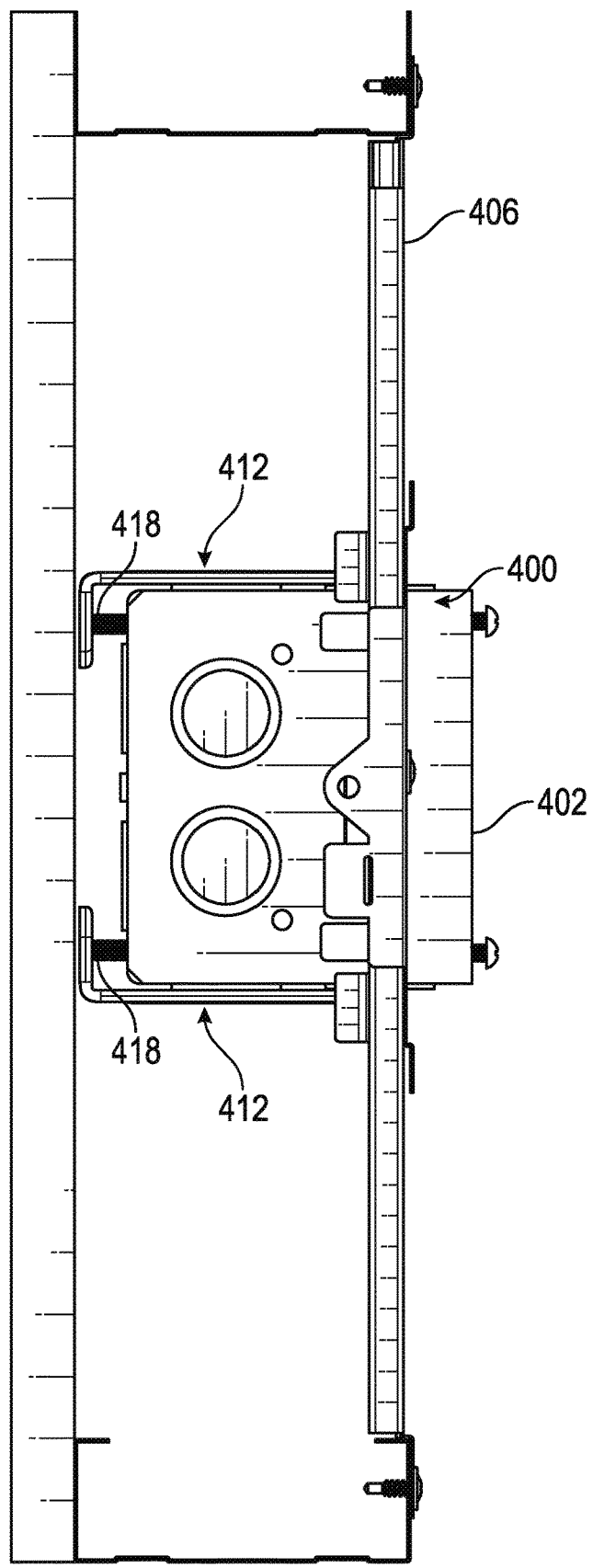
FIG. 11 is a top plan view of the bracket of FIG. 9, installed on a support structure.

FIGS. 9 through 11 illustrate another bracket 400 configured to allow manual adjustment of a mounting depth of an electrical box 402 relative to a support structure (e.g., telescoping between-stud brackets 406 of FIG. 11), from the interior of the electrical box 402. The bracket 400 is generally similar in design and functionality to the bracket 300 of FIGS. 7 and 8, and discussion of bracket 300 above generally also applies to the bracket 400 (and vice versa). In this regard, for example, a support body 408 includes a body opening 410 that is fully enclosed by surrounding material of the support body 408 (see FIG. 10), such as may provide for improved strength and durability of the bracket 400. Further, two independent support arms 412 extend integrally from opposing edges of the body opening 410, each with an extension portion 414 and a distal bend that leads to a free end proximate a support portion 416.

Continuing, threaded fasteners 418 are riveted to the support portions 416 to be rotatably supported in alignment with opposing rear corners of the electrical box 402, with heads of the fasteners 418 disposed inside of the electrical box 402 for adjustment (see FIG. 10). As also shown in FIG. 10 in particular, the fasteners 418 are thus generally constrained to move only axially (and rotationally about their own axes) relative to the interior of the electrical box 402, and to move axially only along a corresponding translation zone 420 of relatively limited size (e.g., extending only 25% of the width of the fasteners 418 beyond the fasteners 418 in any direction perpendicular to the rotational axes of the fasteners 418). Thus, as also discussed above, the fasteners 418 may impose relatively minimal reductions in available space for electrical devices within the electrical box 402. Further, the translation zones 420 being of relatively small area and being disposed on opposing corners of the electrical box 402 can allow for easy adjustment of the fasteners 418 despite the presence of electrical-device mounting tabs 404 on other corners of the electrical box 402 (or elsewhere on other boxes).

As a further example, referring again to FIG. 9, the support arms 412 taper from a perspective moving from the body opening 410 toward the support portions 416. As also discussed below, this taper (and others) can allow for more economical manufacturing of the disclosed brackets, while also ensuring appropriate overall strength for the support arms. Additionally, tapered support arms can improve accessibility an electrical boxes supported by the brackets. For example, as illustrated for the bracket 400, the taper of the support arms 412—as shown, from more than half to less than a quarter of the widths of the body opening 410 and the electrical box 402—can allow users to easily access all four large rear knock-outs 422 of the electrical box 402 and two of the large knock-outs 424 on the corresponding lateral side of the electrical box 402. Thus, despite providing relatively secure and highly adjustable support, the support arms 412 can still allow users to configure the electrical box 402 with a high degree of flexibility, including relative to use of the knock-outs 422, 424.

As still another example, the support arms 412 can also provide a far-side support for the bracket 400 or for a larger bracket assembly. As illustrated in FIG. 11, for example, the support arms 412 extend rearward from the between-stud bracket 406 so that the support portions 416 thereof are adjacent to a far-side (e.g., drywall) surface. Thus, the support arms 412 can help to prevent the brackets 400, 406 or the electrical box 402 from being pushed rearwardly relative to the larger support structure. In this regard, lips 426 along the outer edges of the support can also be useful: not only can the lips 426 provide improved structural rigidity for the support arms 412, but they can also create a recessed area 428 (see FIG. 9) within which the riveted end of the fasteners 418 can freely rotate without interference from any far-side structure. Further in this regard, the independent, spaced-apart, opposite-corner configuration of the support portions 416 can contribute to particularly stable far-side support functionality (e.g., in contrast to a single, bridging support member that extends between mid-points of opposing lateral sides of an electrical box).

Despite many similarities, the bracket 400 also differs from the bracket 300 of FIGS. 7 and 8 in some aspects. For example, to further guide movement of the electrical box 402 during depth adjustment, the support body 408 also includes guide tabs 430. As illustrated in FIG. 9 in particular, the guide tabs 430 extend integrally from the body, adjacent to attachment arms 432, 434 (with bendable tabs 436), into alignment with the body opening 410 (i.e., to overlap with a rearward projection of the area of the body opening 410). Accordingly, when the electrical box 402 is slidingly disposed within the body opening 410, the guide tabs 430 resiliently engage the corresponding side walls of the electrical box 402 and thereby assist to maintain an aligned and smooth movement of the electrical box 402 within the body opening 410 during depth adjustment. Thus, in the illustrated embodiment, the electrical box 402 can be laterally stabilized on all four sides, by a combination of the support arms 412 and the guide tabs 430, so that relatively smooth adjustment and stable anchoring of the electrical box 402 can be achieved.

In some embodiments, brackets according to the invention can be formed from stamping of single-piece blanks. As opposed to some conventional approaches, this may improve manufacturing efficiency, reduce manufacturing costs, and provide brackets of higher and more reliable quality than other methods. Further, integrally-formed brackets can be easier to manage during installation and adjustment, and can allow for improved inventory efficiency.

Figure 12:
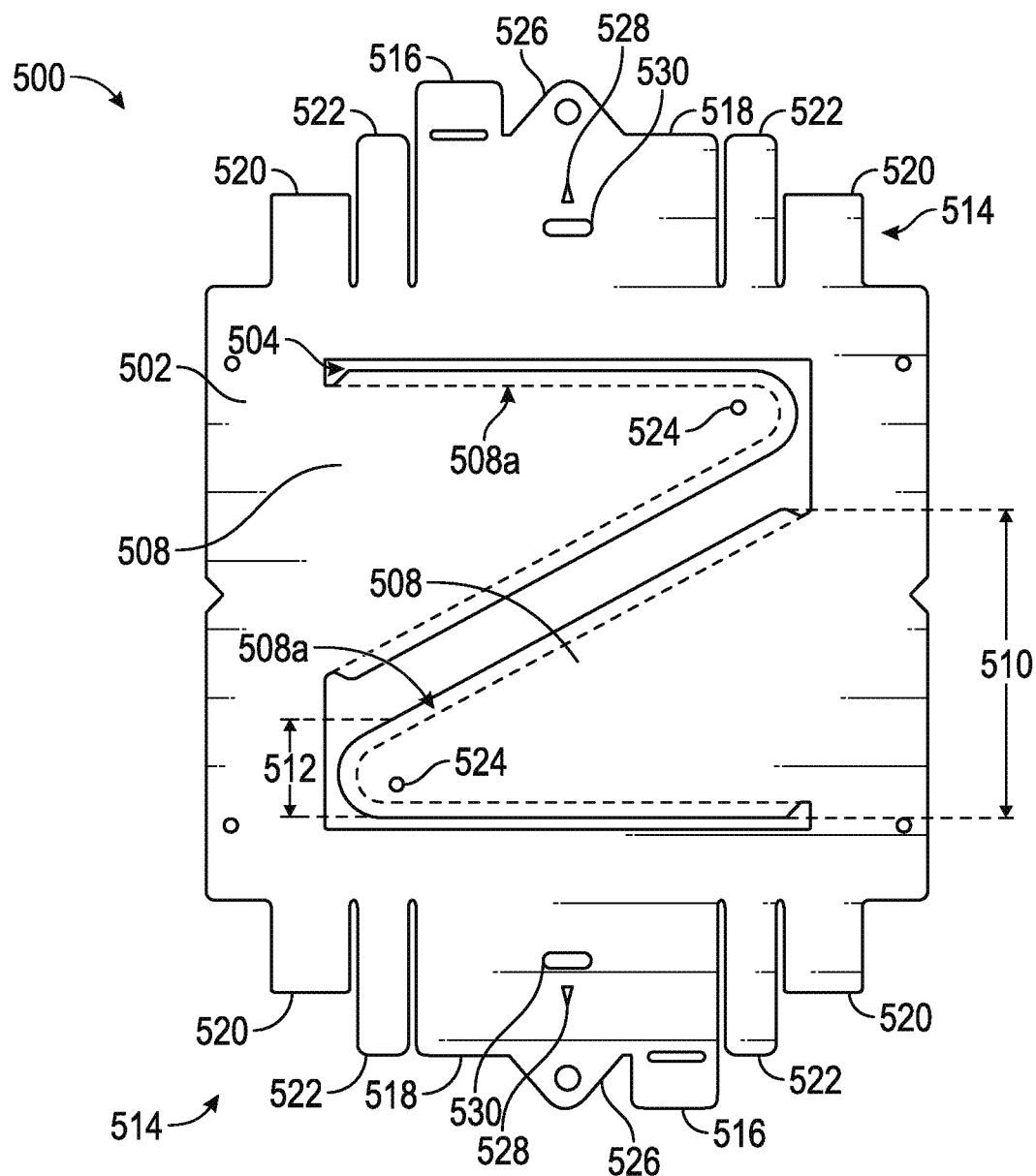
FIG. 12 is a top plan view of a manufacturing blank for a bracket according to an embodiment of the invention.

In this regard, for example, FIG. 12 illustrates a manufacturing blank 500 that can be formed, through a series of stamping operations, into the bracket 400. In particular, the blank 500 includes a single-piece planar body 502 that may be initially stamped from a larger piece of sheet metal and that fully encloses a central body opening 504. The body opening 504 is generally rectangular (e.g., square), with a rectangular perimeter profile that is interrupted along opposing edges 506 by opposing supports 508 that extend from the edges 506 into the body opening 504, although other opening shapes are also possible. Further, the supports 508 taper, from a perspective moving from the edges 506 towards the distal ends of the supports 508, from a maximum width 510 that is more than 50% of a corresponding width of the body opening 504 (e.g., 67%) to a width 512 of less than 25% of the width of the body opening 504 (e.g., 22%) at a location corresponding to openings 524 that will support a threaded fastener for adjustment of the electrical box. Overall, the supports 508 thus occupy most (e.g., 75%, 80%, or more) of the area of the body opening 504. In some cases, and in other similar configurations, this can provide substantial material efficiencies for manufacturing. As also discussed above, it can also allow the resulting support arms 412 to provide access to the knock-outs 422, 424 (see, e.g., FIG. 9) and help to ensure appropriate overall strength when the supports 508 are formed into the support arms 412 (see, e.g., FIG. 9), particularly when edge regions 508a of the supports 508 are folded to form the lips 426 (see, e.g., FIG. 9).

The body 502 also includes sets of arms 514 on opposing sides thereof, extending from an outer edge of a main part of the body 502, in a direction away from the body opening 504. In the illustrated embodiment, the arms 514 extend from different opposing sides of the body 502 and in different opposing directions than do the supports 508, as may allow for particularly effective collective engagement of an electrical box and a support structure by features formed by the arms 514 and the supports 508. In other embodiments, however, other configurations are possible.

Although a variety of arm configurations are possible, in the illustrated embodiment the sets of arms 514 are symmetrical relative to each other, about a central axis of the blank 500, and each set of arms 514 is internally symmetrical about a perpendicular axis, except for tab extensions 516 that correspond to the bendable tabs 436 (as further discussed below), such as may result in the bracket 400 exhibiting particularly reliable stability. In particular, each of the sets of arms 514 includes a central attachment arm 518 that extends farther from the main portion of the body 502 (and the body opening 504) than opposing peripheral attachment arms 520, with the tab extension 516 extending outwardly from one lateral side of the central attachment arm 518. Additionally, guide arms 522 extend by the same distance as the central attachment arm 518, between the central attachment arm 518 and the peripheral attachment arms 520.

As further detailed below, the attachment arms 520 correspond to the attachment arms 432 (see, e.g., FIG. 9), the attachment arms 518 correspond to the attachment arms 434, and the guide arms 522 correspond to the guide tabs 430. Thus, with continue reference also to FIG. 9, the illustrated spatial arrangement of the sets of arms 514 may be particularly beneficial, including so that there is an appropriately wide spacing between the attachment arms 432, so that the attachment arms 434 are sufficiently long to extend around a support structure when in a bent configuration, and so that the guide tabs 430 are sufficiently long to extend into the body opening 410 to engage the electrical box 402. However, a variety of other arm configurations are also possible.

In some cases, other beneficial features can also be provided. For example, anchor extensions 526 on the attachment arms 518 can provide attachment locations for cables or other devices to further help support the bracket 400 relative to support structures. As another example, alignment features such as indexing indents 528 can help to appropriate align a centerline of an electrical box during installation. Mounting openings 530 can also help with visual alignment or can serve as anchor points for fasteners that are used to further secure the bracket 400 in place.

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

In this regard, some embodiments can include a method of manufacturing for a bracket (e.g., an integrally formed bracket) for adjustable-depth mounting of electrical boxes. For example, still referring to FIGS. 9 and 12, a method of manufacturing the bracket 400 can include initially stamping the shape of the blank 500 from a single piece of metal material. Further operations can then be executed on the blank 500 to form the edge regions 508a of the supports 508 into the lips 426, to bend the supports 508 into the support arms 412. The sets of arms 514 can also be bent, including multiple bends, respectively, to form the attachment arms 518, 520 and the guide arms 522, into the attachment arms 432, 434 and the guide tabs 430. Generally, the tab extension 516 can be left as the guide tab 430 in an un-bent configuration until installation, when the guide tab 430 can be used to secure the bracket 400 as needed (e.g., as generally discussed above). The various bends noted above can be executed in different orders, in different implementations, including with one or more bends executed simultaneously (i.e., as part of a single stamping step).

The discussion above is framed relative to particular brackets and associated arrangements. However, those of skill in the art will recognize that this discussion implicitly also discloses various methods of adjustably mounting electrical boxes relative to support structures. Similarly, as also discussed above, the particular configurations of the support bodies and other components expressly described and illustrated in the various embodiments are presented as examples only, and the concepts disclosed herein can be used to adjustably secure electrical boxes (or other components) relative to a variety of bracket configurations and support structures. In this regard, for example, brackets according to some embodiments can be configured for attachment to between-stud supports, as integral parts of between-stud supports, for attachment directly to building studs or other building structures, and so on. Further, specific features discussed in detail relative to certain embodiments can be generally configured or used similarly with other embodiments, including relative to similar features on those embodiments or as substitutions or additions to those embodiments.

Thus, embodiments of the invention can provide improved brackets for adjustable mounting of electrical boxes. For example, some embodiments can provide brackets that allow an electrical bracket to be adjusted among any number of different mounting depths relative to a support structure, including any number of different mounting depths along a continuous range of depths.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A bracket assembly for adjustable-depth mounting of an electrical box relative thereto, the bracket assembly comprising:
   a support body including a body opening that is fully enclosed by the support body and sized to slidably receive the electrical box;
   a first support arm extending integrally from the support body adjacent the body opening and including a first support portion rotatably supporting a first threaded fastener that threadedly engages with the electrical box to be rotatable from inside the electrical box to adjust a depth of the electrical box within the body opening; and
   a second support arm extending integrally from the support body adjacent the body opening, opposite the first support arm, and including a second support portion rotatably supporting a second threaded fastener that threadedly engages with the electrical box to be rotatable from inside the electrical box to adjust a depth of the electrical box within the body opening, the second support portion arranged diagonally opposite the first support portion relative to the body opening.

2. The bracket assembly of claim 1, wherein the first and second support portions extend transversely from the respective first and second support arms to be disposed behind a rear wall of the electrical box.

3. The bracket assembly of claim 2, wherein the first and second threaded fasteners are axially fixed relative to the corresponding first or second support ends and are rotatable relative to the corresponding first or second support ends; and
   wherein the rear wall of the electrical box at fastener openings on the rear wall, so that the electrical box is axially movable relative to the first and second threaded fasteners at the fastener openings.

4. The bracket assembly of claim 2, wherein at least one of the first support arm or the second support arm is configured to provide a far-side support for the bracket assembly relative to a far-side support structure opposite the support body.

5. The bracket assembly of claim 4, wherein the first and second support portions include lips along outer edges thereof, the lips defining a respective recessed area along each of the first and second support ends in which the first and second threaded fasteners are received to be spaced from the far-side support structure when the first and second support portions are seated against the far-side support structure.

6. The bracket assembly of claim 1, further comprising a plurality of guide tabs that extend integrally from the support body to biasingly engage side walls of the electrical box to guide translational movement of the electrical box within the body opening.

7. The bracket assembly of claim 6, wherein the first and second support arms extend along first and second side walls of the electrical box and the side walls of the electrical box with which the plurality of guide tabs are biasingly engaged are third and fourth side walls extending between the first and second side walls.

8. The bracket assembly of claim 1, wherein the first support arm extends from a first edge of the body opening and the second support arm extends from a second edge of the body opening, opposite the first edge.

9. A bracket assembly for adjustable-depth mounting of an electrical box relative to a support structure, the bracket assembly comprising:
   a support body that is configured to be secured to the support structure, the support body including a body opening sized to slidably receive the electrical box; and
   a first support arm and a second support arm extending integrally from the support body on opposing sides of the body opening, the first support arm extending independently relative to the second support arm;
   each of the first and second support arms having a support portion configured to extend partly across a respective corner of the body opening, the respective corners being located diagonally opposite each other;
   with the electrical box in the body opening, each of the support portions retains a respective fastener extending through a rear wall of the electrical box with the respective fasteners configured to be engageable from inside the electrical box to move the electrical box to any of a plurality of depths relative to the support body.

10. The bracket assembly of claim 9, wherein each of the respective fasteners is axially fixed relative to the corresponding first or second support arm and is rotatable relative to the corresponding first or second support arm; and
wherein each of the respective fasteners extends through and is axially movable relative to a fastener opening on the rear wall of the electrical box.

11. The bracket assembly of claim 10, wherein each of the respective fasteners is a respective threaded fastener that is configured to move axially relative to the corresponding fastener opening upon rotation of the respective threaded fastener relative to the corresponding first or second support arm.

12. The bracket assembly of claim 9, wherein each of the first and second support arms has a respective continuous lip extending along an outer edge thereof.

13. The bracket assembly of claim 9, wherein the first and second support arms are shaped to provide clearance for user access to a respective knockout opening in a corresponding side wall of the electrical box.

14. The bracket assembly of claim 13, wherein, proximate the body opening, each of the first and second support arms extends from the respective corner and along more than half of the corresponding opposing side of the body opening.

15. The bracket assembly of claim 9, further comprising:
a first guide tab and a second guide tab on opposing sides of the support body;
wherein the first and second guide tabs extend past a corresponding edge of the body opening to resiliently engage opposing side walls of the electrical box to slidably support the electrical box within the body opening.

16. The bracket assembly of claim 15, wherein the first and second guide tabs are disposed on different sides of the body opening than the first and second support arms.

17. The bracket assembly of claim 16, wherein the first and second guide tabs extend from outer edges of the support body, opposite the body opening, and the first and second support arms extend from edges of the body opening.

18. A method of producing a bracket assembly for adjustable-depth mounting of an electrical box relative to a support structure, the method comprising:
stamping a blank from a single piece of metal material into a predetermined shape, the blank including a support body with a body opening sized to slidably receive the electrical box and a first support arm and a second support arm extending integrally from the support body on opposing sides of the body opening;
bending the first and second support arms at the body opening to extend the first and second support arms rearward of the support body; and
forming a distal bend in each of the first and second support arms to form respective support portions configured to extend partly across a respective corner of the body opening, the respective corners of the body opening located diagonally opposite each other;
the support portions each configured to retain a fastener configured to be adjusted from inside the electrical box relative to the corresponding first and second support arms to move the electrical box to any of a plurality of depths relative to the support body.

19. The method of claim 18, further comprising:
bending outer edges of the first and second support arms to form lips along the first and second support arms.

20. The method of claim 18, wherein the stamping further forms a first guide tab and a second guide tab on opposing sides of the support body, and the method further includes:
bending the first and second guide tabs to extend past a corresponding edge of the body opening, the first and second guide tabs configured to resiliently engage opposing side walls of the electrical box to slidably support the electrical box within the body opening.

* * * * *

UNITED STATES PATENT AND TRADEMARK OFFICE
CERTIFICATE OF CORRECTION

| | | |
|---|---|---|
| PATENT NO. | : 12,007,069 B2 | Page 1 of 1 |
| APPLICATION NO. | : 18/457902 | |
| DATED | : June 11, 2024 | |
| INVENTOR(S) | : Jeffrey Alan Wilson et al. | |

It is certified that error appears in the above-identified patent and that said Letters Patent is hereby corrected as shown below:

In the Specification

Column 5, Line 11, "electric al" should be --electrical--.

Signed and Sealed this
Twentieth Day of August, 2024

Katherine Kelly Vidal
*Director of the United States Patent and Trademark Office*